W. H. WYLES.
RETRIEVER CORD GUIDE FOR TROLLEY POLES.
APPLICATION FILED APR. 1, 1921.
1,395,623.
Patented Nov. 1, 1921.
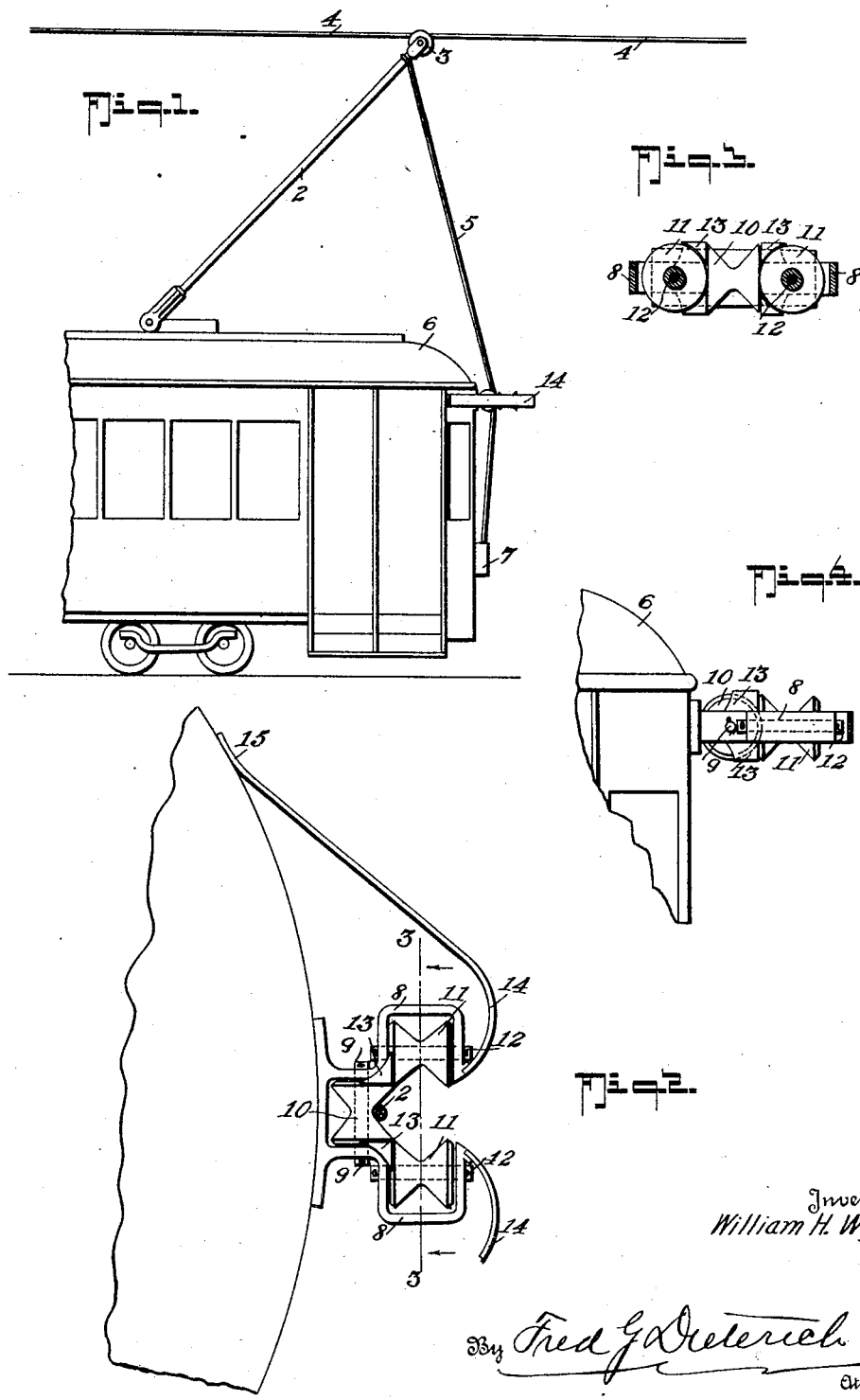
Inventor
William H. Wyles
By Fred G. Dieterich
Attorney

UNITED STATES PATENT OFFICE.

WILLIAM H. WYLES, OF NORTH VANCOUVER, BRITISH COLUMBIA, CANADA, ASSIGNOR OF ONE-HALF TO ERNEST JOHN DEACON, OF VANCOUVER, BRITISH COLUMBIA, CANADA.

RETRIEVER-CORD GUIDE FOR TROLLEY-POLES.

1,395,623. Specification of Letters Patent. Patented Nov. 1, 1921.

Application filed April 1, 1921. Serial No. 457,605.

*To all whom it may concern:*

Be it known that I, WILLIAM H. WYLES, citizen of the Dominion of Canada, residing at North Vancouver, in the Province of British Columbia, Canada, have invented certain new and useful Improvements in Retriever-Cord Guides for Trolley-Poles, of which the following is a specification.

This invention relates to an anti-friction guide for the retrieving cord of the trolley pole of an electric car.

In order to save injury to the guys of an overhead trolley wire by the trolley pole when its sheave runs off the wire, the upper end of the trolley pole is connected by a cord to what is known as a "retriever" secured on the end of the car body. This "retriever," when the trolley sheave jumps off the overhead wire, immediately draws down and retains the trolley pole in that drawn down position until such time as the conductor can replace the sheave on the wire.

This retrieving cord being frequently drawn to one side or the other when the car takes a curve, and being in a continual state of up and down movement as the trolley head follows inequalities in the level of the trolley wire between its supports, is subjected to a considerable amount of wear where it leaves the "retriever" box and also where it passes over the after edge of the car roof.

It is to avoid this wear and lessen the friction resisting the endwise movement of the cord, that the invention, which is the subject of this application has been devised.

The invention is fully described in the following specification, reference being made to the drawings by which it is accompanied, in which:

Figure 1 is a side elevation of the end of a street car showing the application of the device to the retrieving cord of the trolley pole.

Fig. 2 is a plan of the anti-friction device to an enlarged scale.

Fig. 3 is a sectional elevation on the line 3—3 in Fig. 2, and

Fig. 4 is a side elevation of the same.

In these drawings 2 represents the trolley pole and 3 its sheave by which contact is made with the overhead wire 4, and 5 represents the retrieving cord connected to the upper end of the trolley pole and extending therefrom around the edge of the roof end 6 for connection to the retriever 7. This retriever need not be further illustrated or described as it forms no part of the invention.

Secured in the middle line of the car to the end 6 of the car roof or adjacent thereto, is a bracket 8 carrying on a pin 9 a small V grooved roller 10 adapted to receive the retrieving cord 5 and retain it in the middle line. On each side of this roller 10 rollers 11 are mounted on pins 12, the periphery of the sheaves 11 being sufficiently close to that of the sheave 10 as to preclude the possibility of the rope getting in between the sheaves, in the furtherance of which object the bracket has projections 13 between the two pins 9 and 12.

From the edge of the bracket 8 adjacent the outer inner edge of each sheave 11 light metal guards 14 are carried around each side and are attached at 15 to the edge of the roof 6. These are designed to facilitate reëntrance of the rope between the sheaves when for any reason it may have got beyond them.

In use, the retrieving cord 4 will normally lie in the groove of the sheave 10, but if for any reason the cord is laterally displaced to either side, as when the head of the trolley pole is drawn to one side when the car is taking a curve, the cord will move into one or the other of the sheaves 11, but will freely return to the sheave 10 when the trolley head resumes its normal medial position. The grooved sheaves 10 and 11 will preferably be made of a light material, such as aluminium, so that they will rotate freely with endwise movement of the cord.

A retriever cord guide is thus provided that will obviate the present destructive wear of the cord, and in lessening the frictional resistance to endwise movement of the cord under the rise and fall of the trolley head, will in many cases lessen the chance of the trolley sheave jumping the track. Further, the V groove of the sheaves being approximately ninety degrees (90°), the combination of them forms the greater part of a square with one corner open through which the cord is introduced, the cord will be little likely to get out. If the cord does get outside the guide it can be readily replaced as the guards 14 will lead it to the sheaves.

Having now particularly described my invention, I hereby declare that what I claim as new and desire to be protected in by Letters Patent, is:

1. A guide for a trolley pole retrieving cord, said guide comprising a grooved sheave rotatably mounted adjacent the edge of the car roof, means preventing the cord laterally leaving the guide pulley, and means leading from each side of the car roof to the outer edges of the guide pulley facilitating reëntrance of the cord into the groove of the sheave.

2. A guide for a trolley pole retrieving cord, said guide comprising a grooved pulley rotatably mounted adjacent the edge of the car roof, a guide pulley mounted on each side of the grooved pulley to rotate on axes at right angles to that of the first named pulley, and means connected to the edge of the car roof on each side and delivering into the space between the two lateral guide pulleys.

3. A guide for a trolley pole retriever cord, said guide comprising a grooved pulley rotatably mounted adjacent the edge of the car roof, a similar grooved pulley rotatably mounted on each side of the first named one on axes at right angles to it, and means connected to the car roof on each side for delivering the cord into the space between the two lateral grooved sheaves.

4. A guide for a trolley pole retrieving cord, said guide comprising a V grooved sheave rotatably mounted in the middle line of the car adjacent the after edge of its roof, a similar grooved sheave rotatably mounted on each side of the first named sheave on axes at right angles to it, and a guide strip secured to the edge of the car roof on each side and to the adjacent edge of the mounting of each lateral sheave.

In testimony whereof I affix my signature.

WILLIAM H. WYLES.